United States Patent [19]

Lee

[11] 4,214,061
[45] Jul. 22, 1980

[54] PRESSURE-SENSITIVE ADHESIVE

[75] Inventor: Yu-Sun Lee, Parma Heights, Ohio

[73] Assignee: The B. F. Goodrich Company, Akron, Ohio

[21] Appl. No.: 957,600

[22] Filed: Nov. 3, 1978

[51] Int. Cl.$^2$ .............................................. C08L 75/00
[52] U.S. Cl. ...................................... 525/455; 525/127
[58] Field of Search .................... 260/859 R; 525/127, 525/455

[56] References Cited

U.S. PATENT DOCUMENTS

| | | | |
|---|---|---|---|
| 3,532,634 | 9/1970 | Schmidle | 260/859 R |
| 3,642,943 | 2/1972 | Noel | 260/859 R |
| 3,690,946 | 9/1972 | Hartmann | 260/859 R |
| 3,694,415 | 9/1972 | Honda | 260/859 R |
| 3,719,638 | 3/1973 | Huemmer | 260/859 R |
| 3,975,457 | 8/1976 | Chang | 260/859 R |
| 4,134,935 | 1/1979 | Quiring | 260/859 R |
| 4,137,389 | 1/1979 | Wingler | 260/859 R |

Primary Examiner—Paul Lieberman
Attorney, Agent, or Firm—J. Hughes Powell, Jr.

[57] ABSTRACT

A pressure-sensitive adhesive comprises the reaction product of (A) at least one alkyl acrylate liquid polymer containing both terminal and random hydroxyl functionality, as well as sulfide and optionally also disulfide linkages near the terminal portions of the polymer molecule; (B) at least one prepolymer of a polyester glycol or a polyalkylene ether glycol with an excess amount of an aromatic diisocyanate; and (C) at least one alkanediol containing from 3 to 10 carbon atoms. Use of the alkanediol improves 180° peel strength and maintains U.V. stability of the adhesive.

31 Claims, No Drawings

PRESSURE-SENSITIVE ADHESIVE

CROSS REFERENCE TO RELATED APPLICATIONS

This application is related to Riew U.S. patent application Ser. No. 782,104 filed Mar. 28, 1977 now U.S. Pat. No. 4,120,766; deVry et al U.S. patent application Ser. No. 829,691 filed Sept. 1, 1977 now U.S. Pat. No. 4,145,514; and Gilles U.S. patent application Ser. Nos. 829,699 and 829,831 filed Sept. 1, 1977 now U.S. Pat. No. 4,145,511.

BACKGROUND OF THE INVENTION

Pressure-sensitive adhesives made from either hydroxyl-terminated polymers or random-hydroxylated polymers are known in the art. U.S. Pat. No. 3,515,773 discloses preparation of pressure-sensitive adhesives from (A) a hydroxyl-terminated diene polymer, and (B) an isocyanate-terminated polyether prepolymer. U.S. Pat. No. 3,532,652 teaches preparation of pressure-sensitive adhesives from (A) an acrylate polymer containing a randomly polymerized hydroxylated monomer, and (B) an isocyanate-terminated polyester or polyether prepolymer. Such adhesives typically are deficient in one or two of the properties of rolling ball tack, 180° peel adhesion and shear adhesion. These deficiencies are remedied by use of a polymer containing both random and terminal hydroxyl functionality as component (A) of the pressure-sensitive adhesive.

Existing processes for production of hydroxyl-terminated liquid polymers are typically two-stage processes, e.g., the processes of U.S. Pat. Nos. 3,712,916 and 3,699,153. An improved one-step process involves use of a hydroxyl-containing disulfide to produce hydroxyl-terminated liquid polymers having sulfide linkages near the terminal portions of the polymer molecule. Some random hydroxyl functionality is also introduced by including small amounts of hydroxyl-containing monomers such as 2-hydroxyethyl acrylate in the monomer mixture.

Further improvement in the manufacture of the random and terminal hydroxylated liquid polymer is attained using a mixture of a small amount of at least one hydroxyl-containing trisulfide together with the hydroxyl-containing disulfide. Such a disulfide-trisulfide mixture permits viscosity control during polymerization with substantially less disulfide required than if the disulfide alone were used, and the resulting hydroxylated polymers have less odor and discolor less upon heating than if the disulfide alone were used. Of course, use of a small amount of the hydroxyl-containing trisulfide also may introduce a small number of disulfide linkages into the hydroxyl-containing liquid polymer, and these linkages are particularly subject to adverse effects of U.V. light.

It has been found that increasing the amount of hydroxyl-containing disulfide and trisulfide relative to other monomers results in hydroxyl-containing polymers which produce pressure-sensitive adhesives having improved 180° peel strength but reduced U.V. stability. New pressure-sensitive adhesives are desired having improved 180° peel strength without sacrifice of U.V. stability.

SUMMARY OF THE INVENTION

A pressure-sensitive adhesive comprises the reaction product of (A) at least one alkyl acrylate liquid polymer containing both terminal and random hydroxyl functionality totaling an average of about 1.4 to about 6 hydroxyl groups per molecule, and having the formula

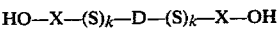

wherein k is 1 or 2, X is $(C_nH_{2n}O)_m(C_nH_{2n})_p$ or $(C_nH_{2n})_m$

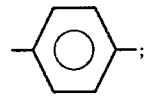

m is an integer from 0 to 10; n and p are integers from 1 to 10; and D is an aliphatic backbone containing polymerized units of at least 65 wt.% based upon total polymer weight of at least one alkyl acrylate wherein the alkyl group contains from 3 to 10 carbon atoms; (B) at least one prepolymer of a polyester glycol or a polyalkylene ether glycol with an excess amount of an aromatic diisocyanate; and (C) at least one alkanediol containing from 3 to 10 carbon atoms.

DETAILED DESCRIPTION

I. ALKYL ACRYLATE LIQUID POLYMERS

The alkyl acrylate liquid polymers used in the pressure-sensitive adhesive of this invention contain both terminal and random hydroxyl groups totaling an average of about 1.4 to about 6 hydroxyl groups per molecule, as well as sulfide and optionally also disulfide linkages near the terminal portions of the polymer molecule. These liquid polymers are believed to have the formula

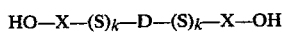

wherein k is 1 or 2; X is $(C_nH_{2n}O)_m(C_nH_{2n})_p$ or $(C_2H_{2n})_m$

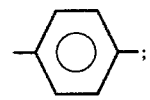

m is an integer from 0 to 10, more preferably from 0 to 4; n and p are integers from 1 to 10, more preferably from 1 to 4; and D is an aliphatic backbone containing polymerized units of at least 65 wt.% based upon total polymer weight of at least one alkyl acrylate wherein the alkyl group contains from 3 to 10 carbon atoms, more preferably from 4 to 8 carbon atoms. Excellent results were obtained using n-butyl acrylate. The backbone D also contains random hydroxyl functionality which can be introduced by a hydroxyl-containing copolymerizable ethylenic monomer such as a hydroxyl-containing ester of acrylic acid, e.g., 2-hydroxyethyl acrylate. The backbone D may also contain polymerized therein minor amounts (i.e., up to 35 wt.%, more preferably up to 20 wt.% based upon total polymer weight) of at least one other copolymerizable ethylenic monomer, preferably a vinylidene comonomer containing at least one terminal $CH_2=C<$ group per molecule. Examples of such comonomers include (a) monoolefins containing 2 to 14 carbon atoms, more preferably 2 to 8 carbon atoms, such as ethylene, propylene, isobutylene, 1-butene, 1-pentene, 1-hexene, 1-dodecene and the like; (b) dienes containing 4 to 10 carbon atoms, more preferably 4 to 8 carbon atoms, such as butadiene, isoprene, 2-isopropyl-1,3-butadiene, and the like; (c) vinyl and allyl esters of carboxylic acids containing 2 to 8 carbon atoms such as vinyl acetate, vinyl propionate, allyl acetate, and the like; (d) vinyl and allyl ethers of alkyl radicals containing 1 to 8 carbon atoms such as vinyl methyl ether, allyl methyl ether, and the like; and (e) acrylic acids and acrylates having the formula

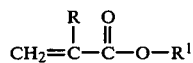

wherein R is hydrogen or an alkyl radical containing 1 to 3 carbon atoms, and $R^1$ is hydrogen or an alkyl radical containing 1, 2 or 11 to 18 carbon atoms, or an alkoxyalkyl, alkylthioalkyl, or cyanoalkyl radical containing 2 to 12 carbon atoms, and wherein R is an alkyl radical containing 1 to 3 carbon atoms and $R^1$ an alkyl radical containing 3 to 10 carbon atoms. Examples of suitable acrylate comonomers include ethyl acrylate, dodecyl acrylate, octadecyl acrylate, methoxyethyl acrylate, butoxyethyl acrylate, hexylthioethyl acrylate, β-cyanoethyl acrylate, cyanooctyl acrylate, methyl methacrylate, ethyl methacrylate, octyl methacrylate and the like.

Other suitable comonomers include (f) vinyl aromatics having the formula

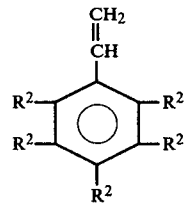

wherein $R^2$ is hydrogen, halogen or an alkyl radical containing 1 to 4 carbon atoms, such as styrene, α-methyl styrene, chlorostyrene, vinyl toluene, and the like; (g) vinyl nitriles having the formula

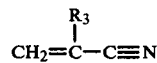

wherein $R^3$ is hydrogen or an alkyl radical containing 1 to 3 carbon atoms, such as acrylonitrile, methacrylonitrile and the like; (h) divinyls and diacrylates such as divinyl benzene, divinyl ether, diethylene glycol diacrylate, and the like; (i) amides of α,β-olefinically unsaturated carboxylic acids containing 2 to 8 carbon atoms such as acrylamide and the like; (j) hydroxyl-containing vinylidene monomers for the purpose of including some random hydroxyl functionality, for example allyl alcohol, vinyl benzyl alcohol, and hydroxyl-containing esters of acrylic acid such as 2-hydroxyethyl acrylate and the like; and (k) other vinylidene monomers such as bis(β-chloroethyl)vinyl phosphonate, N-vinyl-2-pyrrolidone, diacetone acrylamide, and the like. Often two or more comonomers are used together. Comonomeric groups (e), (f), (g), (i), (j) and (k) are are preferred. Excellent results were obtained using ethyl acrylate, acrylonitrile, 2-hydroxyethyl acrylate, N-vinyl-2-pyrrolidone and diacetone acrylamide.

Examples of useful polymeric backbones in the hydroxylated liquid alkyl acrylate polymers include poly(n-butyl acrylate/N-vinyl-2-pyrrolidone/2-hydroxyethyl acrylate), poly(n-butyl acrylate/ethyl acrylate/N-vinyl-2-pyrrolidone/2-hydroxyethyl acrylate), poly(n-butyl acrylate/butadiene/N-vinyl-2-pyrrolidone/2-hydroxyethyl acrylate, and poly(n-butyl acrylate/ethyl acrylate/acrylonitrile/2-hydroxyethyl acrylate). In the latter four backbones, random hydroxylation is provided using 2-hydroxyethyl acrylate. Of course, each polymer backbone has terminal hydroxyl functionality provided by the hydroxyl-containing disulfide and hydroxyl-containing trisulfide as described heretofore.

Hydroxyl-containing disulfides and trisulfides suitable for use in the process of this invention have the formulas

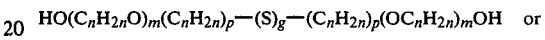

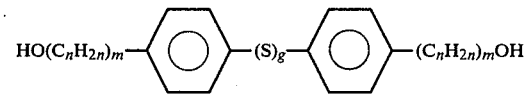

wherein n, m and p are as defined heretofore, and g is 2 or 3 (disulfide or trisulfide). Examples of suitable hydroxyl-containing disulfides and trisulfides include bis(2-hydroxyethyl)disulfide, bis(2-hydroxyethyl)trisulfide, bis(3-hydroxypropyl)disulfide, bis(3-hydroxypropyl)trisulfide and the like. The disulfide and trisulfide act both as polymerization initiators and as polymerization modifiers. The amount of disulfide-trisulfide mixture will vary according to the desired polymeric molecular weight but typically is from about 1 to 20 weight percent, more preferably from 1 to 10 weight percent, based upon total monomeric weight. The hydroxyl-containing trisulfide typically constitutes from about 1 to about 25 weight percent of the disulfide-trisulfide mixture, more preferably from about 2 to about 10 wt.% of the disulfide-trisulfide mixture. Excellent results were obtained using a mixture of about 95 wt.% bis(2-hydroxyethyl)disulfide and 5 wt.% bis(2-hydroxyethyl)trisulfide.

Thermal polymerization or photopolymerization may be used for the polymerization process of this invention, with thermal polymerization being preferred. The polymerization may be conducted by any method known to the art, including bulk, solution, suspension and emulsion methods. Solvents for the monomer and/or polymer can be used during polymerization, including benzene, aliphatic hydrocarbons such as hexane and heptane, ketones such as acetone, and alcohols such as methanol, ethanol, t-butanol, and the like. Well known suspension techniques comprise suspending the monomeric material, preferably already mixed with the hydroxyl-containing disulfide and trisulfide, in the form of small particles in a non-solvent liquid such as water, together with a suspending agent to aid in maintaining the particles separate from one another during polymerization. Suitable suspending agents include starch, carboxymethylcellulose, and the like. Emulsion polymerization is similar, except that emulsifiers are used to produce much smaller particles, and the end product is a stable aqueous emulsion of the polymer. Suitable emulsifiers include sodium or potassium fatty acid soaps, sodium alkaryl sulfonates, and the like.

Thermal polymerization typically is conducted with stirring at about 80°–90° C., with cooling provided if necessary. On the other hand, photopolymerization may be conducted in the presence of radiation at wavelengths from about 1,850 Å to about 6,000 Å, more preferably from about 2,400 Å to about 4,000 Å. Common sources of such radiation include mercury lamps and arcs, carbon arcs and hydrogen discharge tubes. The vessel in which the photopolymerization is conducted may be transparent to light of the desired wavelength, with the light source located external to the vessel so that light can pass through the sides of the vessel. Suitable glasses are available commercially and include borosilicates ("Pyrex"), "Vycor" or soft glass. Alternatively, the light source my be placed within the reaction vessel, either directly above the surface of the reaction mixture or within the mass of the reaction mixture. In some cases a sensitizer may be useful in catalytic amounts to accelerate the photopolymerization, including ketones such as acetone, benzophenone and the like.

Air or oxygen has an inhibiting effect upon the polymerization and preferably is excluded from the reaction vessel. Therefore, the reaction vessel desirably is flushed with nitrogen before the vessel is charged, and a nitrogen purge may be continued if necessary to exclude air during polymerization. The polymerization rate may be monitored by withdrawing reaction mixture samples at periodic intervals for percent conversation analysis. The reaction can be run to 100% conversion, but it generally is more economical to run to about 70–98% conversion and recover unreacted monomers for reuse. The hydroxyl-containing liquid polymer may be purified by vacuum distillation or by washing with water in order to remove the unreacted hydroxyl-containing disulfide and trisulfide, followed by drying the polymer. The structure of the hydroxyl-containing liquid polymer can be confirmed by infrared analysis, together with well known wet chemical methods for determination of hydroxyl and sulfur content. Number average molecular weight ($\overline{M}_n$) of the hydroxylated liquid polymers typically range from about 1,000 to about 6,000, more preferably from about 2,000 to about 5,000, as measured using gel permeation, cryoscopic, ebullioscopic or osmometric methods. The hydroxylated liquid alkyl acrylate polymers typically have Brookfield viscosities at 25° C. from about 50,000 cps. to about 2,000,000 cps., more preferably from about 100,000 cps. to about 1,000,000 cps.

II. PREPOLYMER OF GLYCOL AND DIISOCYANATE

Component (B) of the pressure-sensitive adhesive of the present invention comprises a prepolymer of a polyester glycol or a polyalkylene ether glycol with an excess amount of an aromatic diisocyanate. Suitable polyalkylene ether glycols are produced by methods well known in the art, contain from 3 to 6 carbon atoms per alkylene group, and have an average molecular weight from about 400 to about 2,000, such as polypropylene ether glycol, polytetramethylene ether glycol (PTMEG) and the like. Preferred polyalkylene ether glycols contain from 3 to 5 carbon atoms per alkylene group and have an average molecular weight from about 400 to 1,500. Excellent results were obtained using polytetramethylene ether glycol having an average molecular weight of about 600. Mixtures of polyalkylene ether glycols may also be used.

Polyester glycols are less preferred for use in the prepolymers. Polyester glycols may be prepared by methods well known to the art for use in the prepolymer, e.g., by an esterification reaction of an aliphatic dicarboxylic acid or anhydride thereof with a glycol. Molar ratios of more than 1 mole of glycol to acid are preferred in order to obtain linear chains containing a preponderance of terminal hydroxyl groups. Suitable aliphatic dicarboxylic acids include adipic, succinic, pimelic, suberic, azelaic, sebacic, and the like or their anhydrides. Preferred dicarboxylic acids are those of the formula HOOC—R—COOH, wherein R is an alkylene radical containing 2 to 8 carbon atoms. More preferred are those represented by the formula $HOOC(CH_2)_xCOOH$, wherein x is a number from 2 to 8. Excellent results were obtained using adipic acid. The glycols used in the preparation of the polyester by reaction with an aliphatic dicarboxylic acid are preferably straight chain glycols containing between 4 to 10 carbon atoms such as 1,4-butanediol, 1,6-hexanediol, 1,8-octanediol and the like. In general the glycol is more preferably of the formula $HO(CH_2)_xOH$, wherein x is 4 to 8. Excellent results were obtained using 1,4-butanediol.

Aromatic diisocyanates suitable for use in the isocyanate-terminated prepolymers contain from 8 to about 24 carbon atoms, preferably from 8 to 16 carbon atoms. Examples of suitable aromatic diisocyanates include p-phenylene diisocyanate, 2,4 and 2,6 isomers of toluene diisocyanate (TDI), 4,4'-biphenylene diisocyanate, 4,4'-diphenylmethylene diisocyanate (MDI), 1,5-naphthylene diisocyanate and the like. Mixtures of aromatic diisocyanates may also be used. Excellent results were obtained using mixtures of 2,4-toluene diisocyanate and 2,6-toluene diisocyanate, particularly a mixture of about 65 wt.% 2,4-toluene diisocyanate and 35 wt.% 2,6-toluene diisocyanate, and a mixture of about 80 wt.% 2,4-toluene diisocyanate and 20 wt.% 2,6-toluene diisocyanate.

The isocyanate-terminated prepolymers may be prepared by reacting an excess (in equivalents) of the aromatic diisocyanate with the polyester glycol or polyalkylene ether glycol described heretofore. The prepolymers may have average molecular weights from about 800 to about 3,000, preferably from about 900 to about 2,000. The prepolymers must contain excess isocyanate (free NCO), typically from about 2 wt.% to about 40 wt.% excess, more preferably from about 3 wt.% to about 35 wt.% excess based upon prepolymer weight. Excellent results were obtained using a prepolymer of toluene diisocyanate and polytetramethylene ether glycol, the glycol having an average molecular weight of about 1,350 and about 6 wt.% free NCO, sold under the trademark Adiprene L-167 by E. I. duPont de Nemours & Co. Excellent results also were obtained using a prepolymer of toluene diisocyanate and polypropylene ether glycol, the prepolymer having an average molecular weight of about 1,775 and about 4.5 wt.% free NCO, sold under the trademark Castomer E-0002 by Witco Chemical Co., Inc.

The isocyanate-terminated prepolymers may be blocked using known blocking agents such as phenols, tertiary alcohols, hydrocyanic acid, oximes such as methyl ethyl ketoxime, and the like. The blocked prepolymer and a both random- and terminal-hydroxylated alkyl acrylate liquid polymer described heretofore may be mixed with an alkanediol to form the adhesive composition of the present invention. Blocking allows storage of the mixture for extended time periods at ambient temperatures without substantial reaction and without adverse effects upon ultimate adhesive properties. The blocked prepolymer in the mixture may be deblocked by heating, typically to about 100°-150° C., and the adhesive composition cured to its final pressure-sensitive state. A catalyst such as dibutyltin dilaurate may be used to accelerate both (1) deblocking and (2) the reaction between (a) and alkanediol and hydroxylated alkyl acrylate liquid polymer and (b) the deblocked prepolymer of glycol and diisocyanate.

III. ALKANEDIOL

Component (C) of the pressure-sensitive adhesive of the present invention is at least one alkanediol containing from 3 to 10 carbon atoms, more preferably 4 to 6 carbon atoms. Suitable alkanediols include 1,4-butanediol, 1,5-pentanediol and 1,6-hexanediol. Excellent results were obtained using 1,4-butanediol and 1,5-pentanediol. The amount of alkanediol typically ranges from about 0.1 wt.% to about 10 wt.%, more preferably from about 0.5 wt.% to about 5 wt.%, based upon weight of hydroxylated alkyl acrylate liquid polymer.

IV. PRESSURE-SENSITIVE ADHESIVE

The pressure-sensitive adhesive of the present invention comprises the reaction product of (A) at least one alkyl acrylate liquid polymer containing both terminal and random hydroxyl functionality as well as sulfide and optionally disulfide linkages near the terminal portions of the polymer molecule, (B) at least one prepolymer of a polyester glycol or a polyalkylene ether glycol with an excess amount of an aromatic diisocyanate and (C) at least one alkanediol containing from 3 to 10 carbon atoms. The adhesive has 180° peel strength substantially better than compositions where the alkanediol is not used, but without sacrifice of U.V. stability. Other pressure-sensitive adhesive properties (rolling ball tack and shear adhesion) remain excellent.

The hydroxylated acrylate liquid polymer (A) and alkanediol (C) typically are used in a ratio to isocyanate-terminated prepolymer (B) sufficient to provide a ratio of about 0.7 to about 4.5 hydroxyl equivalents per free isocyanate equivalent. A preferred ratio is about 1.1 to about 2.5 hydroxyl equivalents per equivalent of free isocyanate.

Catalysts well known to the art may be used for the hydroxyl-isocyanate reaction, typically in amounts from about 0.001% to about 0.5% by weight of total reactants. Suitable catalysts include stannous salts of aliphatic carboxylic acids containing from 1 to 20 carbon atoms, such as stannous octoate, stannous neodecanoate and the like. Other suitable catalysts include lead naphthenate, dibutyltin dilaurate, and the like. Excellent results were obtained using dibutyltin dilaurate.

A solvent for the pressure-sensitive adhesive composition need not be used, thereby avoiding toxicity and flammability problems, excessive bulk per unit amount of adhesive, and extra costs of the solvent itself. However, a solvent or solvent mixture may be desired in some cases to enhance compatibility and flow properties of the pressure-sensitive adhesive components before and during reaction. As is usually true with isocyanate-containing compositions, it is desirable to exclude as much water as possible; therefore, the solvents should be as anhydrous as possible. Suitable solvents include liquid aromatic hydrocarbons such as benzene, toluene, xylene, mesitylene and the like; liquid ketones such as methyl ethyl ketone, methyl butyl ketone and the like; liquid chlorinated hydrocarbons such as methylene chloride, 1,1,1-trichloroethane and the like; liquid esters such as ethyl acetate, 2-ethoxyethyl acetate and the like; and liquid alkanes such as pentane, hexane, heptane and the like. Solvent mixtures may also be used. Excellent results were obtained using toluene together with ethyl acetate.

A tackifying additive is not required but may be used to impart increased pressure-sensitivity and tackiness to an adhesive of this invention. A tackifier may be used in an amount from about 0 to about 30 parts by weight and more of tackifier per 100 parts by weight of adhesive. Suitable tackifying additives include chlorinated biphenyl resins, such as chlorinated biphenyl and chlorinated polyphenyl; coumarone-indene resins, such as polymerized coal-tar light oils; plasticizers such as dioctyl phthalate; polystyrenes such as poly($\alpha$-methyl styrene); polyterpene resins such as poly($\beta$-pinene); rosin and rosin derivatives, such as the glycerol ester of hydrogenated rosin and methyl ester of hydrogenated rosin; and the like. Chain extenders may be used, including other polyols such as the glycols described in connection with preparation of the isocyanate-terminated prepolymer, as well as amines and the like. Other additives known in the art may also be used, such as antioxidants, photostabilizers, flow modifiers including sintered colloidal silicas such as those sold under the trademark Cab-O-Sil by Cabot Corporation, and the like.

The components of the pressure-sensitive adhesive may be combined and mixed in any order and by any method that (1) provides both a final homogeneous liquid dispersion or solution, and (2) allows sufficient time after mixing so that casting or application can be performed before substantial thickening or solidification occurs. Such mixing techniques are well known in the art and may be performed using equipment such as the Liquid Control Corporation Twinflo ® machine.

When mixing is complete, the mixture is applied to a substrate such as paper, plastic film, release paper, metal foil or the like. Conventional application or casting means can be used to meter and obtain a desired uniform thickness across a given substrate, such as a wire-wound rod, gravure coater, differential roll coater, reverse roll coater, knife-over-roll coater or the like.

The coated substrate is generally cured partially or completely by heating before winding, particularly if a solvent is used. However, the coated substrate may be wound before curing if a buld adhesive without solvent is used. Suitable heating means include circulating air ovens, infrared heaters and heated drums.

The following examples illustrate the present invention more fully.

EXAMPLES

I. MATERIALS

Random & Terminal Hydroxylated Alkyl Acrylate Liquid Polymer Made With Higher Amount of Bis-(2-hydroxyethyl) Disulfide—Liquid Polymer A An alkyl acrylate liquid polymer (Liquid Polymer A) containing both random and terminal hydroxyl functionality was prepared by polymerization of a monomer mixture in the presence of a relatively large amount (6 wt. parts per 100 wt. parts of monomer) of a disulfide-trisulfide mixture according to the following recipe:

| Material | Parts | Kg. | (lbs.) |
|---|---|---|---|
| n-Butyl Acrylate | 93 | 15.8 | (34.8) |
| N-Vinyl-2-Pyrrolidone | 5 | 0.85 | (1.87) |
| 2-Hydroxyethyl Acrylate | 2 | 0.34 | (0.75) |
| Disulfide-Trisulfide Mixture* | 6 | 1.02 | (2.24) |
| Azoisobutyronitrile | 1 | 0.17 | (0.37) |
| Acetone Solvent | 50 | 8.48 | (18.7) |
| | 157 | 26.66 | (58.73) |

*Bis(2-hydroxyethyl) disulfide containing about 5 wt.% bis (2-hydroxyethyl) trisulfide as an impurity A blend of 1.02 kg. disulfide-trisulfide mixture and 3.95 kg. acetone was prepared (blend #1). Also prepared was a blend of 15.8 kg. n-butyl acrylate, 0.34 kg. 2-hydroxyethyl acrylate, and 0.85 kg. N-vinyl-2-pyrrolidone (blend #2), and a blend of 0.17 kg. azoisobutyronitrile and 4.53 kg. acetone (blend #3).

A 15-gallon reactor was equipped with a twin-blade turbine stirrer, and a feed tank, dip tube and proportioning pumps for feeding monomers into the reactor. The reactor was cleaned thoroughly with acetone and dried with nitrogen. The reactor was evacuated three times and the vacuum broken each time with nitrogen. Thereafter a small nitrogen purge was maintained during polymerization. Agitation was begun, and blend #1 was charged to the reactor and heated quickly to 90° C. Blends #2 and #3 were proportioned separately into the reactor over a period of about 50 minutes. When charging was complete, reaction was continued for about 2 more hours, after which the reactor and contents were cooled rapidly to about 30° C. Reactor contents were dried at about 115° C. and 100 mm Hg using a Rodney-Hunt evaporator.

A liquid polymer was recovered. It was a hydroxyl-terminated poly(n-butyl acrylate/N-vinyl-2-pyrrolidone/2-hydroxyethyl acrylate) having both terminal and random hydroxyl functionality. The polymer had a Brookfield viscosity at 25° C. of about 224,000 cps, and a hydroxyl number of 39.5.

Random & Terminal Hydroxylated Alkyl Acrylate Liquid Polymer Made with Lower Amount of Bis-(2-hydroxyethyl) Disulfide—Liquid Polymer B Similarly, an alkyl acrylate liquid polymer (Liquid Polymer B) containing both random and terminal hydroxyl functionality was prepared by polymerization of a monomer mixture in the presence of a relatively small amount (3 wt. parts per 100 wt. parts of monomer) of a disulfide-trisulfide mixture according to the following recipe:

| Material | Parts | Kg. | (lbs.) |
|---|---|---|---|
| n-Butyl Acrylate | 93 | 17.76 | (39.15) |
| N-Vinyl-2-Pyrrolidone | 5 | 0.95 | (2.10) |
| 2-Hydroxyethyl Acrylate | 2 | 0.38 | (0.84) |
| Disulfide-Trisulfide Mixture* | 3 | 0.57 | (1.26) |
| Azoisobutyronitrile | 1 | 0.19 | (0.42) |
| Acetone Solvent | 50 | 9.54 | (21.04) |
| | 154 | 29.39 | (64.81) |

*Bis(2-hydroxyethyl) disulfide containing about 5 wt.% bis (2-hydroxyethyl) trisulfide as an impurity A blend of 0.57 kg. disulfide-trisulfide mixture and 5 kg. acetone was prepared (blend #1). Also prepared was a blend of 17.76 kg. n-butyl acrylate, 0.38 kg. 2-hydroxyethyl acrylate, and 0.95 kg. N-vinyl-2-pyrrolidone (blend #2), and a blend of 0.19 kg. azoisobutyronitrile and 4.54 kg. acetone (blend #3).

The three blends were charged, reacted and recovered by the same general procedure used to produce Liquid Polymer A. Liquid Polymer B was also a liquid polymer. It was a hydroxyl-terminated poly(n-butyl acrylate/N-vinyl-2-pyrrolidone/2-hydroxyethyl acrylate) having both terminal and random hydroxyl functionality. The polymer had a Brookfield viscosity at 25° C. of about 490,000 cps. and a hydroxyl number of 26.9.

Prepolymer of Glycol and Diisocyanate

Component (B) of the pressure-sensitive adhesive in the examples was a prepolymer of (1) toluene diisocyanate and (2) polypropylene ether glycol. The prepolymer was found to have an average molecular weight of about 1,775 and about 4.3 to 4.7 wt.% free NCO. The prepolymer is sold under the trademark Castomer E-0002 by Witco Chemical Co., Inc.

II. TEST PROCEDURES

Each adhesive was tested using three standard Pressure Sensitive Tape Council test methods: (1) rolling ball tack, (PSTC-6, issued 10/64); (2) 180° peel adhesion (PSTC-1, revised 4/66); and (3) shear adhesion at 70° C. (commonly called static shear—see PSTC-7, revised 4/66) using a 6.45 cm$^2$ contact area and a 1 kg. weight.

In each example (1) a hydroxylated liquid polymer was mixed with (2) Castomer E-0002 and (3) an alkanediol. Mixing was done by hand using a spatula. Each mixture was spread onto a 2-mil (0.05 mm) Mylar sheet and cured at 150° C. for 2 minutes, after which the above tests were performed. The cured adhesive had a thickness of 1 mil (0.025 mm).

U.V. stability was tested by applying a 2.54 cm wide specimen of Mylar-mounted adhesive (prepared as described above) to an aluminum Q panel, so as to laminate the cured adhesive between the Mylar and the panel.

This laminate was exposed for 85 hours to U.V. light generated by an Atlas carbon arc weather-o-meter (Atlas Model DMC-H sold by Atlas Electric Devices Co., Chicago, Illinois) employing a water spray cycle of 18 minutes every 2 hours. Each exposed sample was then evaluated by noting the degree of yellowing which had occurred.

III. EXAMPLES 1-4

Example 1 demonstrates that a pressure-sensitive adhesive incorporating a random and terminal hydroxylated liquid polymer made using a higher level of bis-(2-hydroxyethyl) disulfide (Liquid Polymer A) has better 180° peel strength than the adhesive of example 2, where the hydroxylated liquid polymer (Liquid Polymer B) was made using a lower level (i.e., about half the amount) of bis-(2-hydroxyethyl) disulfide. However, the example 1 adhesive having better 180° peel strength was also found to have reduced U.V. stability, compared to the example 2 adhesive.

Examples 3 and 4 demonstrate that use of 1,4-butanediol and 1,5-pentanediol respectively in the adhesive recipe permit use of a hydroxylated liquid polymer (Liquid Polymer B) made using a lower level of bis-(2-hydroxyethyl) disulfide. These adhesives attain excellent 180° peel strengths essentially like that of the example 1 [high bis-(2-hydroxyethyl) disulfide] adhesive, yet maintain the U.V. stability of the example 2 [low bis-(2-hydroxyethyl) disulfide] adhesive.

Recipes and test data are set forth in Table I. Recipe amounts are in grams except where otherwise indicated.

TABLE I
PRESSURE-SENSITIVE ADHESIVE RECIPE AND DATA

| | Example | | | |
|---|---|---|---|---|
| | 1 | 2 | 3 | 4 |
| Material | | | | |
| Liquid Polymer A* | 15.0 | — | — | — |
| Liquid Polymer B** | — | 15.0 | 15.0 | 15.0 |
| 1,4-Butanediol | — | — | 0.244 | — |
| 1,5-Pentanediol | — | — | — | 0.283 |
| Castomer E-0002 | 8.75 | 3.84 | 6.32 | 6.81 |
| Dibutyltin dilurate | 1 drop | 1 drop | 1 drop | 1 drop |
| Solvent*** | 5.9 | 4.7 | 4.7 | 4.7 |
| OH/NCO Ratio, Equivalents | 1.3 | 1.7 | 1.8 | 1.7 |
| Test Data | | | | |
| 180° Peel Strength, N/m (oz./in.) | 547–613 (50–56) | 416–460 (38–42) | 547 (50) | 602 (55) |
| Appearance after UV Exposure | Darker Yellow | Lighter Yellow | Lighter Yellow | Lighter Yellow |
| Static Shear | + | + | + | + |
| Rolling Ball Tack | 2.8 cm | 2.3 cm | 2.3 cm | 3.3 cm |

*Made using higher lever of bis-(2-hydroxyethyl) disulfide
**Made using lower lever of bis-(2-hydroxyethyl) disulfide
***73 wt.% toluene and 27 wt.% ethyl acetate
+ No failure after 100 hours at 70° C.

The compositions of this invention are improved pressure-sensitive adhesives, useful either in solution or in bulk for labels, other laminate structures, and the like.

I claim:

1. A pressure sensitive adhesive composition comprising the reaction product of (A) at least one alkyl acrylate liquid polymer containing both terminal and random hydroxyl functionality totaling an average of about 1.4 to about 6 hydroxyl groups per molecule, and having the formula $$HO-X-(S)_k-D-(S)_k-X-OH$$

wherein k is 1 or 2, X is $(C_nH_{2n}O)_m(C_nH_{2n})_p$ or $(C_nH_{2n})_m$

m is an integer from 0 to 10; n and p are integers from 1 to 10; and D is an aliphatic backbone containing polymerized units of at least 65 weight percent based upon the total polymer weight of at least one alkyl acrylate wherein the alkyl group contains from 3 to 10 carbon atoms, (B) at least one isocyanate prepolymer of a polyester glycol or a polyalkylene ether glycol, and (C) at least one alkanediol containing from 3 to 10 carbon atoms.

2. A composition of claim 1 wherein said alkyl acrylate liquid polymer has an average molecular weight from about 1,000 to about 6,000.

3. A composition of claim 2 wherein said alkyl acrylate liquid polymer contains copolymerized therein at least one other olefinically unsaturated monomer and said glycol as a polyalkylene ether glycol containing from 3 to 6 carbon atoms per alkylene group.

4. A composition of claim 3 wherein said olefinically unsaturated monomer is a vinylidene comonomer containing at least one terminal $CH_2=C<$ group per molecule.

5. A composition of claim 4 wherein said vinylidene comonomer is selected from the group consisting of (1) acrylic acids and acrylates (other than those used as the primary monomer(s)) having the formula

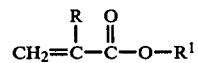

wherein R is hydrogen or an alkyl radical containing 1 to 3 carbon atoms, and $R^1$ is hydrogen or an alkyl radical containing 1, 2 or 11 to 18 carbon atoms, or an alkoxyalkyl, alkylthioalkyl, or cyanoalkyl radical containing 2 to 12 carbon atoms, or wherein R is an alkyl radical containing 1 to 3 carbon atoms and $R^1$ an alkyl radical containing 3 to 10 carbon atoms, (2) vinyl aromatics having the formula

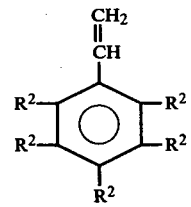

wherein $R^2$ is hydrogen, halogen or an alkyl radical containing 1 to 4 carbon atoms, (3) vinyl nitriles having the formula

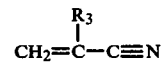

wherein $R^3$ is hydrogen or an alkyl radical containing 1 to 3 carbon atoms, (4) amides of α,β-olefinically unsaturated carboxylic acids containing 2 to 8 carbon atoms, (5) hydroxyl-containing vinylidene monomers for the purpose of including some random hydroxyl functionality, and (6) N-vinyl-2-pyrrolidone and diacetone acrylamide.

6. A composition of claim 5 wherein said vinylidene comonomer is at least one compound selected from the group consisting of ethyl acrylate, styrene acrylonitrile, N-vinyl-2-pyrrolidone and diacetone acrylamide, and HO—x—(S)—X is derived from bis(2-hydroxyethyl)

disulfide, bis(2-hydroxyethyl) trisulfide, bis(3-hydroxypropyl) disulfide, and bis(3-hydroxypropyl) trisulfide.

7. A composition of claim 6 wherein said alkanediol (component C) contains from 4 to 6 carbon atoms.

8. A composition of claim 7 wherein component B is a prepolymer of polytetramethylene ether glycol with toluene diisocyanate, or a prepolymer of polypropylene ether glycol with toluene diisocyanate.

9. A composition of claim 8 wherein the backbone of said alkyl acrylate liquid polymer (component A) contains polymerized therein n-butyl acrylate, ethyl acrylate, N-vinyl-2-pyrrolidone and a hydroxyl-containing ester of acrylic acid.

10. A composition of claim 9 wherein said hydroxyl-containing ester of acrylic acid is 2-hydroxyethyl acrylate, and said alkanediol is 1,4-butanediol.

11. A composition of claim 9 wherein said hydroxyl-containing ester of acrylic acid is 2-hydroxyethyl acrylate, and said alkanediol is 1,5-pentanediol.

12. A composition of claim 9 wherein said hydroxyl-containing ester of acrylic acid is 2-hydroxyethyl acrylate, and said alkanediol is 1,6-hexanediol.

13. A cured composition of claim 1.

14. A laminate structure having an adhesive composition comprising the reaction product of (A) at least one alkyl acrylate liquid polymer containing both terminal and random hydroxyl functionality totaling an average of about 1.4 to about 6 hydroxyl groups per molecule, and having the formula $$HO-X-(S)_k-D-(S)_k-X-OH$$

wherein k is 1 or 2, X is $(C_nH_{2n}O)_m(C_nH_{2n})_p$ or $(C_nH_{2n})_m$

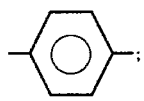

m is an integer from 0 to 10; n and p are integers from 1 to 10; and D is an aliphatic backbone containing polymerized units of at least 65 wt. % based upon the total polymer weight of at least one alkyl acrylate wherein the alkyl group contains from 3 to 10 carbon atoms; (B) at least one isocyanate prepolymer of a polyester glycol or a polyalkylene ether glycol with an excess amount of an aromatic diisocyanate; and (C) at least one alkanediol containing from 8 to 10 carbon atoms.

15. A laminate structure of claim 14 wherein said alkyl acrylate liquid polymer has an average molecular weight from about 1,000 to about 6,000.

16. A laminate structure of claim 15 wherein said alkyl acrylate liquid polymer contains copolymerized therein at least one other olefinically unsaturated monomer.

17. A laminate structure of claim 16 wherein said olefinically unsaturated monomer is a vinylidene monomer containing at least one terminal CH$_2$=C> group per molecule.

18. A laminate structure of claim 17 wherein said vinylidene comonomer is at least one compound selected from the group consisting of (1) acrylic acids and acrylates (other than those used as the primary monomer(s)) having the formula

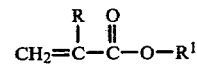

wherein R is hydrogen or an alkyl radical containing 1 to 3 carbon atoms, and R$^1$ is hydrogen or an alkyl radical containing 1, 2 or 11 to 18 carbon atoms, or an alkoxyalkyl, alkylthioalkyl, or cyanoalkyl radical containing 2 to 12 carbon atoms, or wherein R is an alkyl radical containing 1 to 3 carbon atoms and R$^1$ an alkyl radical containing 3 to 10 carbon atoms, (2) vinyl aromatics having the formula

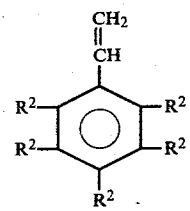

wherein R$^2$ is hydrogen, halogen or an alkyl radical containing 1 to 4 carbon atoms, (3) vinyl nitriles having the formula

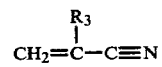

wherein R$^3$ is hydrogen or an alkyl radical containing 1 to 3 carbon atoms, (4) amides of $\alpha,\beta$-olefinically unsaturated carboxylic acids containing 2 to 8 carbon atoms, (5) hydroxyl-containing vinylidene monomers for the purpose of including some random hydroxyl functionality, and (6) N-vinyl-2-pyrrolidone and diacetone acrylamide.

19. A laminate structure of claim 18 wherein said vinylidene comonomer is at least one compound selected from the group consisting of ethyl acrylate, styrene, acrylonitrile, N-vinyl-2-pyrrolidone and diacetone acrylamide.

20. A laminate structure of claim 19 wherein said alkanediol (component C) contains from 4 to 6 carbon atoms.

21. A laminate structure of claim 20 wherein component B is a prepolymer of polytetramethylene ether glycol with toluene diisocyanate, or a prepolymer of polypropylene ether glycol with toluene diisocyanate.

22. A laminate structure of claim 21 wherein the backbone of said alkyl acrylate liquid polymer (component A) contains polymerized therein n-butyl acrylate, ethyl acrylate, N-vinyl-2-pyrrolidone and a hydroxyl-containing ester of acrylic acid.

23. A laminate structure of claim 22 wherein said hydroxyl-containing ester of acrylic acid is 2-hydroxyethyl acrylate, and said alkanediol is 1,4-butanediol.

24. A laminate structure of claim 22 wherein said hydroxyl-containing ester of acrylic acid is 2-hydroxyethyl acrylate, and said alkanediol is 1,5-pentanediol.

25. A laminate structure of claim 22 wherein said hydroxyl-containing ester of acrylic acid is 2-hydroxyethyl acrylate, and said alkanediol is 1,6-hexanediol.

26. A cured laminate structure of claim 14.

27. A process comprising mixing and curing a composition comprising (A) at least one alkyl acrylate liquid polymer containing both terminal and random hydroxyl functionlity totaling an average of about 1.4 to about 6 hydroxyl groups per molecule, and having the formula HO—X—(S)$_k$—D—(S)$_k$—X—OH wherein K is 1 or 2, X is $(C_nH_{2n}O)_m(C_nH_{2n})_p$ or $(C_nH_{2n})_m$ m is an integer from 0 to 10; n and p are integers from 1 to 10; and D is an aliphatic backbone containing polymerized units of at least 65 weight percent based upon the total polymer weight of at least one alkyl acrylate wherein the alkyl group contains from 3 to 10 carbon atoms, (B) at least one prepolymer of a polyalkylene ether glycol or polyester glycol with an excess amount of an aromatic diisocyanate, and (C) at least one alkanediol containing from 3 to 10 carbon atoms, wherein (1) said alkyl acrylate liquid polymer contains an average from about 1.4 to about 6 hydroxyl groups per molecule, and contains polymerized therein at least about 65 wt.% of at least one alkyl acrylate, the alkyl group of which contains from 3 to 10 carbon atoms, (2) said polyalkylene ether glycol contains from 3 to 6 carbon atoms per alkylene group and has an average molecular weight from about 400 to about 2,000, (3) said aromatic diisocyanate contains from 8 to about 24 carbon atoms, (4) said prepolymer has an average molecular weight from about 800 to about 3,000, and (5) the ratio of hydroxyl equivalents to free isocyanate equivalents is from about 0.7/1 to about 4.5/1.

28. A composition of claim 1 wherein (B) is at least one prepolymer of a polyalkylene ether glycol or polyester glycol reacted with an excess of an aromatic diisocyanate wherein said glycols have an average molecular weight from about 400 to about 2,000, said aromatic diisocyanate contains from 8 to about 24 carbon atoms, said prepolymer has an average molecular weight from about 800 to about 3,000 and the ratio of hydroxyl equivalents to free isocyanate equivalents is from about 0.7/1 to about 4.5/1.

29. A composition of claim 2 wherein m is 0 to 4, n and p are integers from 1 to 4, D is an aliphatic backbone containing polymerized units of at least 65 weight percent based on the total polymer weight of at least one alkyl acrylate wherein the alkyl group contains 4 to 8 carbon atoms.

30. A composition of claim 29 wherein HO—X—(S)$_k$ is derived from bis(2-hydroxyethyl) disulfide, bis(2-hydroxyethyl) trisulfide, bis(3-hydroxypropyl) disulfide, and bis(3-hydroxypropyl) trisulfide.

31. A laminate structure of claim 14 having an adhesive composition comprising at least one prepolymer of a polyalkylene ether glycol or polyester glycol with an excess of an aromatic diisocyanate wherein said glycol has an average molecular weight from about 400 to about 2,000, said aromatic diisocyanate contains from 8 to about 24 carbon atoms, said prepolymer has an average molecular weight from about 800 to about 3,000 and the ratio of hydroxyl equivalents to free isocyanate equivalents is from about 0.7/1 to about 4.5/1.

* * * * *